US007156355B2

(12) United States Patent
Loparo

(10) Patent No.: US 7,156,355 B2
(45) Date of Patent: Jan. 2, 2007

(54) SINGLE ARM ARTICULATED DESK ORGANIZER

(75) Inventor: Chuck Loparo, Hoffman Estates, IL (US)

(73) Assignee: Custom Plastics, Inc., Elk Grove Village, IL (US)

(*) Notice: Subject to any disclaimer, the term of this patent is extended or adjusted under 35 U.S.C. 154(b) by 0 days.

(21) Appl. No.: 10/819,562

(22) Filed: Apr. 6, 2004

(65) Prior Publication Data

US 2005/0218286 A1 Oct. 6, 2005

(51) Int. Cl.
*F16M 13/00* (2006.01)

(52) U.S. Cl. ........................ 248/429; 248/917; 248/918

(58) Field of Classification Search ................ 248/429, 248/128, 131, 132, 918, 163.2, 188.1, 286.1; 211/47, 48
See application file for complete search history.

(56) References Cited

U.S. PATENT DOCUMENTS 3,436,046 A * 4/1969 Valeska .................. 248/284.1
3,901,728 A * 8/1975 Opal ......................... 134/25.2
4,826,123 A * 5/1989 Hannah et al. ............. 248/248
4,863,124 A * 9/1989 Ball et al. ..................... 108/28
4,901,972 A 2/1990 Judd et al.
5,211,367 A 5/1993 Musculus
5,429,336 A * 7/1995 Ko .......................... 248/278.1
5,533,820 A * 7/1996 Ambrose .................... 400/472
6,076,785 A * 6/2000 Oddsen, Jr. .............. 248/118.3
6,454,369 B1 * 9/2002 Cooper et al. ........... 312/223.3
6,488,248 B1 * 12/2002 Watt et al. ............... 248/279.1
6,688,709 B1 * 2/2004 Ishola ..................... 312/208.1

* cited by examiner

*Primary Examiner*—Amy J. Sterling
(74) *Attorney, Agent, or Firm*—McHale & Slavin PA

(57) ABSTRACT

Disclosed is a desk organizer that employees a mounting bracket that is securable beneath the surface of a desk or the like working table. The mounting bracket includes flanges for receipt of a support base allowing receptacles to be moved along the length of the mounting bracket for access or concealment thereof. The support base includes an eccentric arm that allows rotation of available receptacles to accommodate a particular working environment. The receptacles may be sized to hold containers, hanging folders, small item receptacles and so forth.

24 Claims, 2 Drawing Sheets

SINGLE ARM ARTICULATED DESK ORGANIZER

FIELD OF THE INVENTION

This invention relates to desk organizers and in particular to a desk organizer that is secured beneath the surface of desk allowing for the placement of office supplies such as hanging files, pencils, and the like.

BACKGROUND OF THE INVENTION

Desktop organizers are very popular in today's business environment providing additional storage areas by which people can sort and store documents and other items. Most every desk has some type of organizer to separate and categorize items needed to perform the functions of the user. Typically found are receptacles for letters, pencils, paper-clips and the like. While such organizers have become a necessity, unfortunately they can consume valuable desk space.

A popular desktop organizer is the multi-tray assembly in which a plurality of trays are stacked one on top of each other in a compact vertical arrangement. Vertically stacked multi-tray organizers provide the user with trays for storing different categories of documents. The vertically stacked organizer increases the amount of items that can be held, but still consumes valuable desktop space.

A modern desk is typically covered with items that are now considered indispensable for business. For example, a modern desktop may include a computer monitor, a keyboard, a personal printer, a palm pilot, which are in addition to the conventional desktop organizers. The result is the need for larger desks, the use of more drawers or file cabinets.

Some working surfaces truly necessitate organizers simply because no drawer space may be available. Such work surfaces provide only a table top so that organizing of pens and pencils would require a container, hanging files would regarding a file cabinet, and so forth. Attempts to accommodate the lack of desktop storage is best illustrated by the use of keyboard trays and supports.

For instance, U.S. Pat. No. 5,211,367 discloses a single arm articulated keyboard support. The keyboard support includes a mounting bracket that is slideably and pivotally connected to a work surface permitting the keyboard to be moved between a raised in-use position to a retracted storage position.

U.S. Pat. No. 4,901,972 discloses a sliding shelf keyboard support for supporting a keyboard between a storage, non-use position and an extending, use position.

Thus, what is lacking in the art is a desk organizer that fits beneath the surface of a desk top and operates in a similar fashion to a drawer yet does not have the limitations of a drawer.

SUMMARY OF THE INVENTION

A desk organizer that mounts beneath the working surface of a desk or table top. The organizer employs a mounting bracket that is preferrably fastened to the lower surface by screw fasteners. The mounting bracket has flanges for receipt of a slidable support base used for holding of receptacles. The slidable support based can be moved along a length of the mounting bracket wherein the receptacles can be pulled out from beneath the desktop for access, or slide underneath the desk for concealment. The support base includes an eccentric arm that allows rotation of the available receptacles to accommodate a particular working environment and further allow for additional leg room by proper positioning. The receptacles may be sized to hold containers, hanging folders, small item receptacles and so forth.

Thus, it is an objective of the present invention to provide a desk organizer with receptacles located beneath the working surface of a desk so that no desktop working space is consumed.

It is a further objective of the instant invention to provide eccentric rotation of one or more receptacles used for storing items beneath the working surface of the desk top. The eccentric rotations allows placement of the items in a convenient location while a slidable track allows concealment of the items upon return to a location beneath the desk top.

It is yet another objective of the present invention to provide receptacles of various sizes and shapes for retainment of different shaped items.

Still another objective of the present invention to provide a receptacle opening for placement of hanging files.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
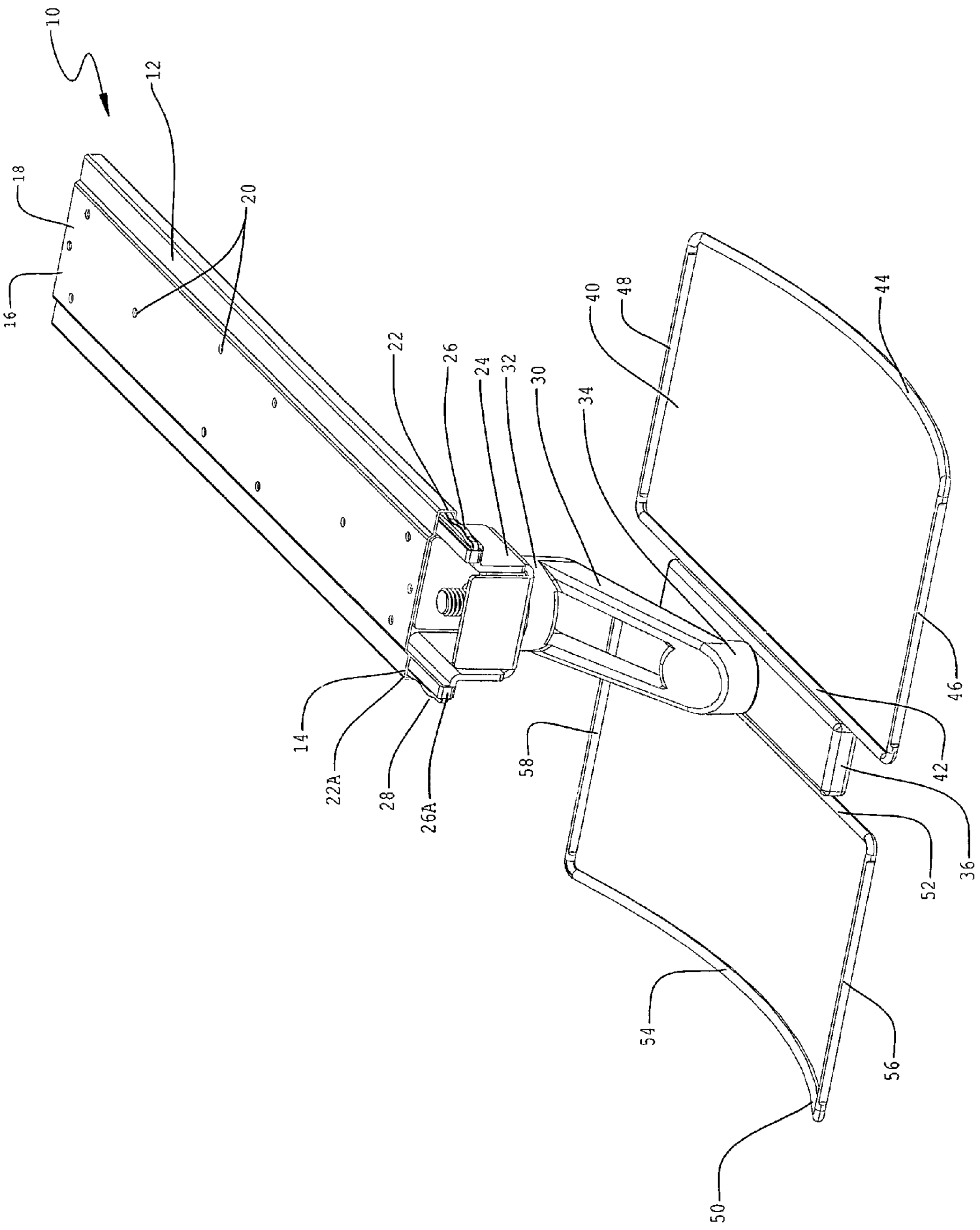
FIG. 1 is a perspective view of the desk organizer of the instant invention having substantially rectangular receptacle holders.

Now referring to FIG. 1 set forth is the desk organizer 10 of the instant invention. The desk organizer consists of a mounting bracket 12 which is securable to the lower surface of a working surface such as a desktop or the like table top. The mounting bracket has a first end 14 and a second end 16 defining a length there between. The top surface 18 of the mounting bracket includes a plurality of apertures 20 available for insertion of a fastener therethrough for securing to the lower surface of the working surface. The apertures are receptive to screws, nails or the like. The mounting bracket may also be secured to the lower surface of the working surface by glue, adhesive tape or any other type of fastener. The mounting bracket 12 is further defined by a pair of receiving flanges 22 and 22*a* which are preferably formed integral to the mounting bracket.

A support post 24 includes a pair of outwardly extending tabs 26 and 26*a* which are positionable within the receiving flanges 22 and 22*a* and slidable along the length between the first end 14 and the second end 16 of the mounting bracket. The outwardly extendingly tabs may include frictionless slide members such as a plastic coating, ball bearings, or lubricant as found in conventional drawer slides. In addition, a stop 28 may be included on the post support 24 to prevent the support post from extending beyond the first end or second end 14, 16 of the mounting bracket once the support post has been positioned within the receiving flanges.

An eccentric support arm 30 has an upper end 32 which is rotatably secured to the support post 24 while in rotation thereof. The lower end 34 of the eccentric support arm 30 is available for attachment to a mounting base 36. The mounting base 36 is rotatable in relation to the eccentric support arm allowing displacement of the mounting base in direct relation to the length and angle of the eccentric support arm.

The mounting base 36 holds the receptacle. In the preferred embodiment to receptacles are securable to the lower end 34 of the support arm 30 by use of the mounting base 36. Each receptacle 40 is formed from two side rod members 42 and 44 that are spaced apart by cross members 46 and 48. Cross frame rod members 46 and 48 are substantially identical in length and are preferably formed from a flattened rigid piece of material such as steel that further operates as a holder for hanging folders such as those made by Pendaflex®. The side rod member 42 is permanently secured to the mounting base 36 so as to maintain cross frame rod members in a horizontal plane. Side rod member 44 includes a bow in the preferred embodiment for an esthetically pleasing appearance. In the preferred embodiment a second receptacle 50 forms a mirror image of the first receptacle 40 having side rod member 52 rigidly secured to mounting base 36 so as to maintain cross members 56 and 58 in a substantially horizontally plane and connected to second rod member 54.

Figure 2:
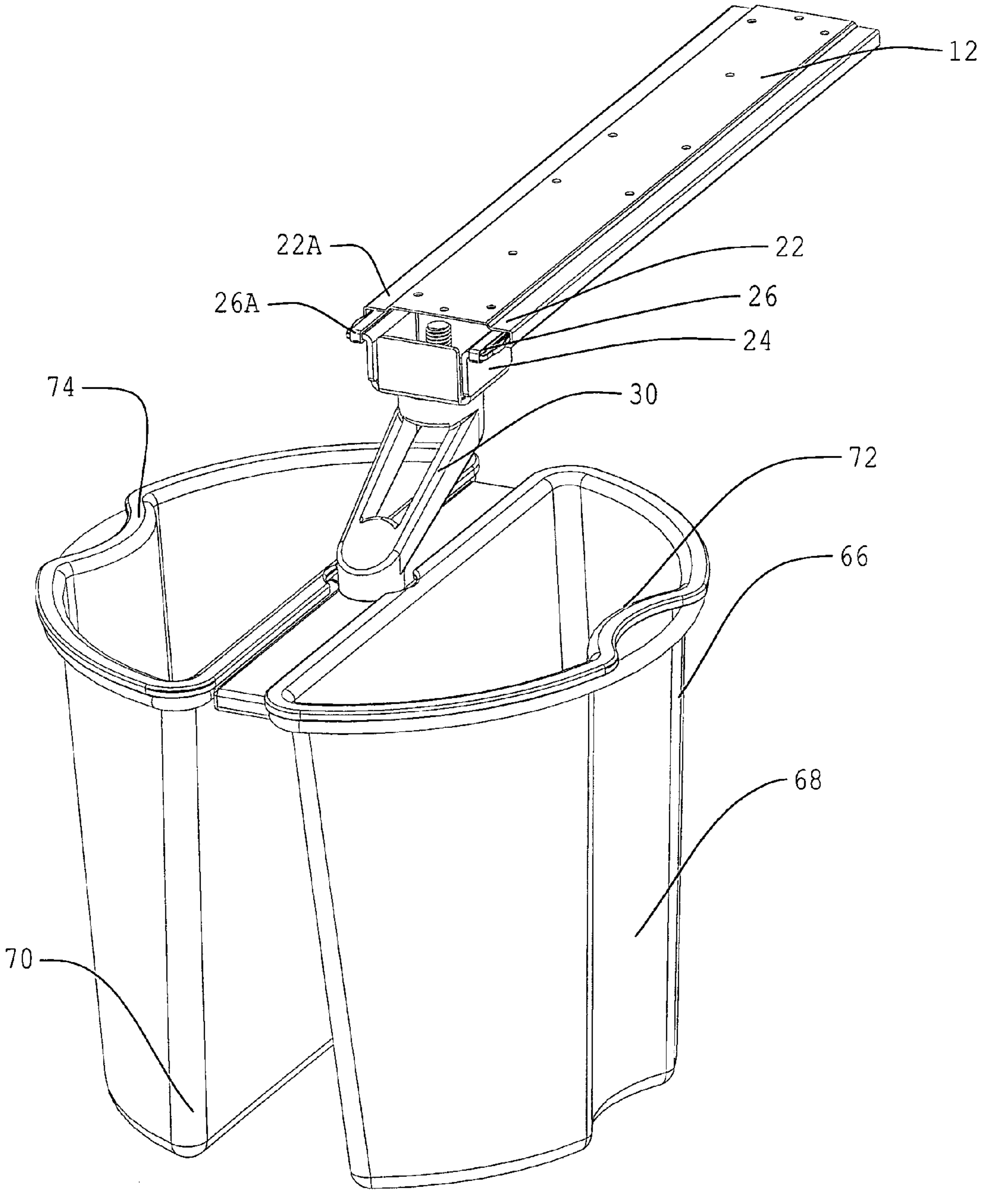
FIG. 2 is a perspective view of the desk organizer having substantially circular receptacles.

Referring now to FIG. 2 set forth is an alternative embodiment holding a different type of receptacle. In this embodiment the mounting bracket 12 is again secured to the lower surface of a working surface such as a desk top or table top. The post support 24 is operatively associated with the mounting bracket having the outward extending tabs 26 and 26*a* engaging the receiving flanges 22 and 22*a* of the mounting bracket. The eccentric support arm 30 is rotatably secured to the post support 24 and is available to attachment of various mounting bases as shown in the previous embodiment and in this embodiment the mounting base 66 is depicted having receptacle 68 and 70 secured thereto. In this embodiment the mounting base 66 has a first contiguous rod member 72 that is attached to the mounting base but provides a support member for the receptacle 68. The receptacle depicted may be used for most any item including pens, pencils, rulers and the like. A second support 74 is depicted in the securement to mounting base 66 form a mirror image of 72 and receptacle 68. From these embodiments it will be apparent that various containers, receptacles, holders and the like may be used as items may permit including lunches, soda cans, cell phones, and a mirid of other items that an employee may use at a desk or the like working surface.

It is to be understood that while we have illustrated and described certain forms of the invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A desk organizer comprising:

a mounting bracket securable to the lower surface of a working surface, said mounting bracket having a first end and a second end with a post support slidable there between;

a support arm having an upper end and a lower end, said upper end secured to said post support; said lower end secured to a mounting base, said mounting base depending from said lower end; said support arm further includes an upper tubular spindle located along said upper end rotatably attached to said post support and a lower tubular spindle located along said lower end rotatably attached to said mounting base and at least one receptacle secured to said mounting base below said lower end of said support arm, wherein said receptacle is formed from two side rod members held spaced apart by cross frame rod members disposed between corresponding ends of said side rod members, said receptacle for holding of objects at a position beneath said mounting base;

whereby placement of said post support along said first end of said mounting bracket places said receptacle at a position outside said working surface for access thereto wherein placement of said post support along said second end of said mounting bracket places said receptacle in a concealed position beneath said working surface.

2. The desk organizer according to claim 1 including a second receptacle formed from two side rod members held spaced apart by cross frame rod members disposed between corresponding ends of said side rod members, said second receptacle attached to said mounting base.

3. The desk organizer according to claim 2 wherein said second receptacle supports a container.

4. The desk organizer according to claim 1 wherein said post support has a pair of outwardly extending tabs for insertion into a pair of horizontal receiving flanges formed integral to said mounting bracket, said tabs slidable along the length of said receiving flanges.

5. The desk organizer of claim 4 wherein at least one said receiving flanges includes a stop to prevent removal of said post support from said receiving flange.

6. A desk organizer comprising:

a mounting bracket securable to the lower surface of a working surface, said mounting bracket having a first end and a second end with a pair of receiving flanges formed integral there between;

a post support having a pair of outwardly extending tabs, said tabs positioned within said receiving flanges and slidable along the length between said first end and said second end of said mounting bracket;

a support arm having an upper end and a lower end, said upper end secured to said post support, said support arm further including an upper tubular spindle located along said upper end rotatably attached to said cost support and a lower tubular spindle located along said lower end rotatably attached to said receptacle and at least one receptacle secured to said lower end of said support arm, said receptacle for holding of objects at a position beneath said mounting base;

whereby placement of said post support along said first end of said mounting bracket places said receptacle at a position outside said working surface for access thereto wherein placement of said post support along said second end of said mounting bracket places said receptacle in a concealed position beneath said working surface.

7. The desk organizer according to claim 6 wherein said receptacle is formed from two side rod members held spaced apart by cross frame rod members disposed between corresponding ends of said side rod members, said receptacle including a mounting base securable to said lower end of said support arm.

8. The desk organizer according to claim 7 including a second receptacle formed from two side rod members held spaced apart by cross frame rod members disposed between corresponding ends of said side rod members, said second receptacle attached to said mounting base, said mounting base securable to said lower end of said support arm.

9. The desk organizer according to claim 6 wherein said receptacle is sized to support hanging file folders, whereby hanging file folders are hung beneath said mounting rail.

10. The desk organizer according to claim 6 wherein said receptacle is sized to receive at least one container.

11. The desk organizer of claim 6 wherein at least one said receiving flange includes a stop to prevent removal of said support post from said receiving flange.

12. A desk organizer comprising:

a mounting bracket securable to the lower surface of a working surface, said mounting bracket having a first end and a second end with a pair of receiving flanges formed integral there between;

a post support having a pair of outwardly extending tabs, said tabs positioned within said receiving flanges and slidable along the length between said first end and said second end of said mounting bracket;

a support arm having an upper end and a lower end, said upper end rotatably secured to said post support; and at least two receptacles secured to said lower end of said support arm, each said receptacle formed from two side rod members held spaced apart by cross frame rod members disposed between corresponding ends of said side rod members, each said receptacle coupled to a mounting base secured to said lower end of said support arm, said receptacle for holding of objects at a position beneath said mounting base;

whereby placement of said post support along said first end of said mounting bracket places said receptacle at a position outside said working surface for access thereto wherein placement of said post support along said second end of said mounting bracket places said receptacle in a concealed position beneath said working surface.

13. The desk organizer according to claim 12 wherein said receptacle is sized to support hanging file folders, whereby hanging file folders are hung beneath said mounting bracket.

14. The desk organizer according to claim 12 wherein said receptacle is sized to receive at least one container.

15. A desk organizer comprising:

a mounting bracket securable to the lower surface of a working surface, said mounting bracket having a first end and a second end with a post support slidable there between;

a support arm having an upper end and a lower end, said upper end secured to said post support; said lower end secured to a mounting base, said mounting base depending from said lower end;

at least one receptacle secured to said mounting base below said lower end of said support arm, wherein said receptacle is formed from two side rod members held spaced apart by cross frame rod members disposed between corresponding ends of said side rod members, said receptacle for holding of objects at a position beneath said mounting base and a second receptacle formed from two side rod members held spaced apart by cross frame rod members disposed between corresponding ends of said rod members, said second receptacle attached to said mounting base;

whereby placement of said post support along said first end of said mounting bracket places said receptacle at a position outside said working surface for access thereto wherein placement of said post support along said second end of said mounting bracket places said receptacle in a concealed position beneath said working surface.

16. The desk organizer according to claim 15 wherein said support arm includes an upper tubular spindle located along said upper end rotatably attached to said post support and a lower tubular spindle located along said lower end rotatably attached to said mounting base.

17. The desk organizer according to claim 15 wherein said second receptacle supports a container.

18. The desk organizer according to claim 15 wherein said post support has a pair of outwardly extending tabs for insertion into a pair of horizontal receiving flanges formed integral to said mounting bracket, said tabs slidable along the length of said receiving flanges.

19. The desk organizer of claim 18 wherein at least one said receiving flanges includes a stop to prevent removal of said post support from said receiving flange.

20. A desk organizer comprising:

a mounting bracket securable to the lower surface of a working surface, said mounting bracket having a first end and a second end with a pair of receiving flanges formed integral there between;

a post support having a pair of outwardly extending tabs, said tabs positioned within said receiving flanges and slidable along the length between said first end and said second end of said mounting bracket;

a support arm having an upper end and a lower end, said upper end secured to said post support;

at least one receptacle secured to said lower end of said support arm, said receptacle for holding of objects at a position beneath said mounting base, said receptacle is formed from two side rod members held spaced apart by cross frame rod members disposed between corresponding ends of said side rod members, said receptacle including a mounting base securable to said lower end of said support arm and a second receptacle formed from two side rod members held spaced apart by cross frame rod members disposed between corresponding ends of said side rod members, said second receptacle attached to said mounting base, said mounting base securable to said lower end of said support arm;

whereby placement of said post support along said first end of said mounting bracket places said receptacle at a position outside said working surface for access thereto wherein placement of said post support along said second end of said mounting bracket places said receptacle in a concealed position beneath said working surface.

21. The desk organizer according to claim 20 wherein said support arm includes an upper tubular spindle located along said upper end rotatably attached to said post support and a lower tubular spindle located along said lower end rotatably attached to said receptacle.

22. The desk organizer according to claim 20 wherein said receptacle is sized to support hanging file folders, whereby hanging file folders are hung beneath said mounting bracket.

23. The desk organizer according to claim 20 wherein said receptacle is sized to receive at least one container.

24. The desk organizer of claim 20 wherein at least one said receiving flanges includes a stop to prevent removal of said post support from said receiving flange.

* * * * *